(12) United States Patent
Lyles

(10) Patent No.: US 6,192,617 B1
(45) Date of Patent: Feb. 27, 2001

(54) ELECTRONIC FISHING LURE ASSEMBLY

(76) Inventor: Adolph L. Lyles, 3706 Nathaniel, Houston, TX (US) 77021

( * ) Notice: Subject to any disclaimer, the term of this patent is extended or adjusted under 35 U.S.C. 154(b) by 0 days.

(21) Appl. No.: 09/466,079

(22) Filed: Dec. 17, 1999

(51) Int. Cl.[7] .................................................. A01K 85/01
(52) U.S. Cl. ........................ 43/42.06; 43/17.1; 43/17.6; 43/42.31
(58) Field of Search ................................ 43/42.06, 17.6, 43/42.31, 17.1

(56) References Cited

U.S. PATENT DOCUMENTS

| | | |
|---|---|---|
| D. 358,630 | 5/1995 | Antuna . |
| 3,841,012 * | 10/1974 | Maled .................................. 43/17.1 |
| 4,583,313 * | 4/1986 | Dugan, Jr. ............................. 43/17.1 |
| 4,805,339 * | 2/1989 | Fuentes et al. ...................... 43/42.31 |
| 4,823,497 * | 4/1989 | Pierce .................................... 43/17.6 |
| 5,018,297 | 5/1991 | Kennedy, Jr. . |
| 5,050,334 | 9/1991 | Standish, Jr. . |
| 5,121,568 | 6/1992 | Lindmeyer . |
| 5,148,622 * | 9/1992 | Blair .................................... 43/42.06 |
| 5,175,951 | 1/1993 | Fruchey . |
| 5,237,771 * | 8/1993 | Watson et al. ...................... 43/42.31 |
| 5,392,555 | 2/1995 | Tingey . |
| 5,485,697 * | 1/1996 | Watson et al. ........................ 43/17.1 |
| 5,511,335 * | 4/1996 | Langer ................................. 43/17.1 |
| 5,697,182 * | 12/1997 | Rodgers ............................... 43/17.1 |

FOREIGN PATENT DOCUMENTS

| | | |
|---|---|---|
| 19512031 * | 10/1996 | (DE) . |
| 2333431 * | 7/1999 | (GB) . |
| 10-33089 * | 2/1998 | (JP) . |
| WO 97/08948 * | 3/1997 | (WO) . |
| WO 97/34469 * | 9/1997 | (WO) . |

* cited by examiner

*Primary Examiner*—Darren W. Ark

(57) ABSTRACT

An electronic fishing lure assembly for attracting fish in all types of water conditions, includes a main body portion having a hollow interior, a plurality of hooks coupled to the main body portion, and a line eye coupled to the main body portion. A scent producing assembly is coupled to the main body portion. A microcontroller is positioned in the hollow interior, the microcontroller being electronically coupled to the scent producing assembly. A switch is coupled to the main body portion, the switch being electrically coupled to the microcontroller for selectively activating the microcontroller. The fishing lure assembly further includes a motion producing assembly and a light source for illuminating the main body portion.

13 Claims, 3 Drawing Sheets

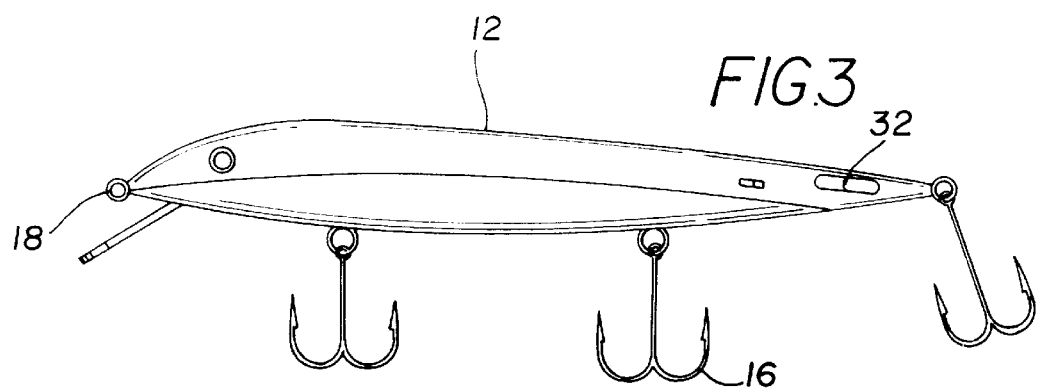
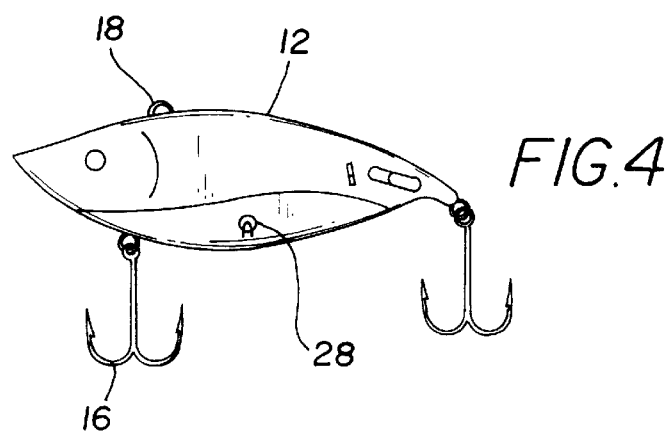
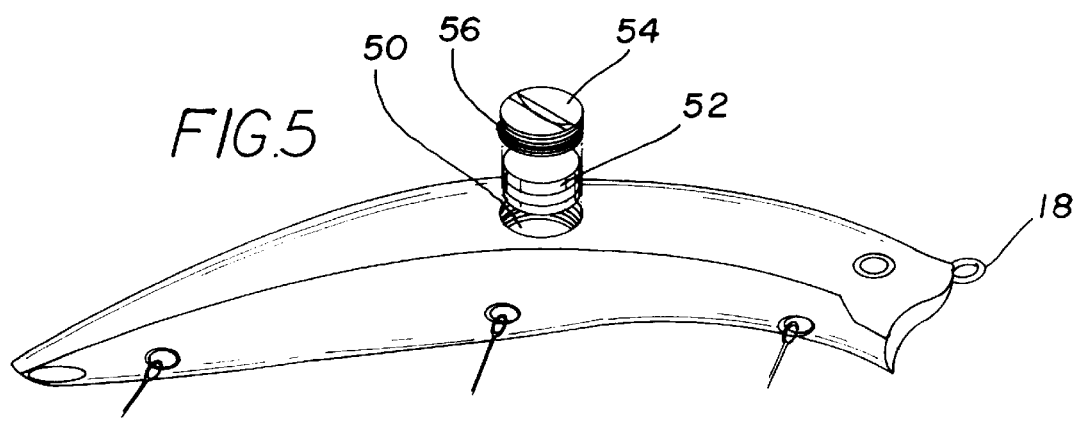

ELECTRONIC FISHING LURE ASSEMBLY

BACKGROUND OF THE INVENTION

1. Field of the Invention

The present invention relates to fishing lures and more particularly pertains to a new electronic fishing lure assembly for attracting fish in all types of water conditions.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,953,319; U.S. Pat. No. 4,823,497; U.S. Pat. No. 5,392,555; U.S. Pat. No. 4,787,167; U.S. Pat. No. 3,535,812; and U.S. Pat. No. 5,237,771.

While these devices fulfill their respective, particular objectives and requirements, the aforementioned patents do not disclose a new electronic fishing lure assembly. The inventive device includes a main body portion having a hollow interior, a plurality of hooks coupled to the main body portion, and a line eye coupled to the main body portion. A scent producing assembly is coupled to the main body portion. A microcontroller is positioned in the hollow interior, the microcontroller being electronically coupled to the scent producing assembly. A switch is coupled to the main body portion, the switch being electrically coupled to the microcontroller for selectively activating the microcontroller. The inventive device further includes a motion producing assembly and a light source for illuminating the main body portion.

In these respects, the electronic fishing lure assembly according to the present invention substantially departs from the conventional concepts and designs of the prior art, and in so doing provides an apparatus primarily developed for the purpose of attracting fish in all types of water conditions.

SUMMARY OF THE INVENTION

In view of the foregoing disadvantages inherent in the known types of fishing lures now present in the prior art, the present invention provides a new electronic fishing lure assembly construction wherein the same can be utilized for attracting fish in all types of water conditions.

The general purpose of the present invention, which will be described subsequently in greater detail, is to provide a new electronic fishing lure assembly apparatus and method which has many of the advantages of the fishing lures mentioned heretofore and many novel features that result in a new electronic fishing lure assembly which is not anticipated, rendered obvious, suggested, or even implied by any of the prior art fishing lures, either alone or in any combination thereof.

To attain this, the present invention generally comprises a main body portion having a hollow interior, a plurality of hooks coupled to the main body portion, and a line eye coupled to the main body portion. A scent producing assembly is coupled to the main body portion. A microcontroller is positioned in the hollow interior, the microcontroller being electronically coupled to the scent producing assembly. A switch is coupled to the main body portion, the switch being electrically coupled to the microcontroller for selectively activating the microcontroller. The inventive device further includes a motion producing assembly and a light source for illuminating the main body portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electronic fishing lure assembly apparatus and method which has many of the advantages of the fishing lures mentioned heretofore and many novel features that result in a new electronic fishing lure assembly which is not anticipated, rendered obvious, suggested, or even implied by any of the prior art fishing lures, either alone or in any combination thereof.

It is another object of the present invention to provide a new electronic fishing lure assembly, which may be easily and efficiently manufactured and marketed.

It is a further object of the present invention to provide a new electronic fishing lure assembly, which is of a durable and reliable construction.

An even further object of the present invention is to provide a new electronic fishing lure assembly which is susceptible of a low cost of manufacture with regard to both materials and labor, and which accordingly is then susceptible of low prices of sale to the consuming public, thereby making such electronic fishing lure assembly economically available to the buying public.

Still yet another object of the present invention is to provide a new electronic fishing lure assembly which provides in the apparatuses and methods of the prior art some of the advantages thereof, while simultaneously overcoming some of the disadvantages normally associated therewith.

Still another object of the present invention is to provide a new electronic fishing lure assembly for attracting fish in all types of water conditions.

Yet another object of the present invention is to provide a new electronic fishing lure assembly which includes a main body portion having a hollow interior, a plurality of hooks coupled to the main body portion, and a line eye coupled to the main body portion. A scent producing assembly is coupled to the main body portion. A microcontroller is positioned in the hollow interior, the microcontroller being electronically coupled to the scent producing assembly. A switch is coupled to the main body portion, the switch being electrically coupled to the microcontroller for selectively activating the microcontroller. The inventive device further includes a motion producing assembly and a light source for illuminating the main body portion.

Still yet another object of the present invention is to provide a new electronic fishing lure assembly that includes a light source for increasing the visibility of the lure to fish in murky water and includes a motion producing assembly for producing a real bait fish type motion. The lure also includes a sound assembly for drawing the attention of the fish to the lure when it cannot be easily seen.

Even still another object of the present invention is to provide a new electronic fishing lure assembly that it utilizes a scent producing assembly in conjunction with a scent capsule to attract the fish with a desirable smell.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of a different application for the present invention.

FIG. 4 is a side view of a different application for the present invention.

FIG. 5 is a top side view of the present invention.

DESCRIPTION OF THE PREFERRED EMBODIMENT

Figure 1:
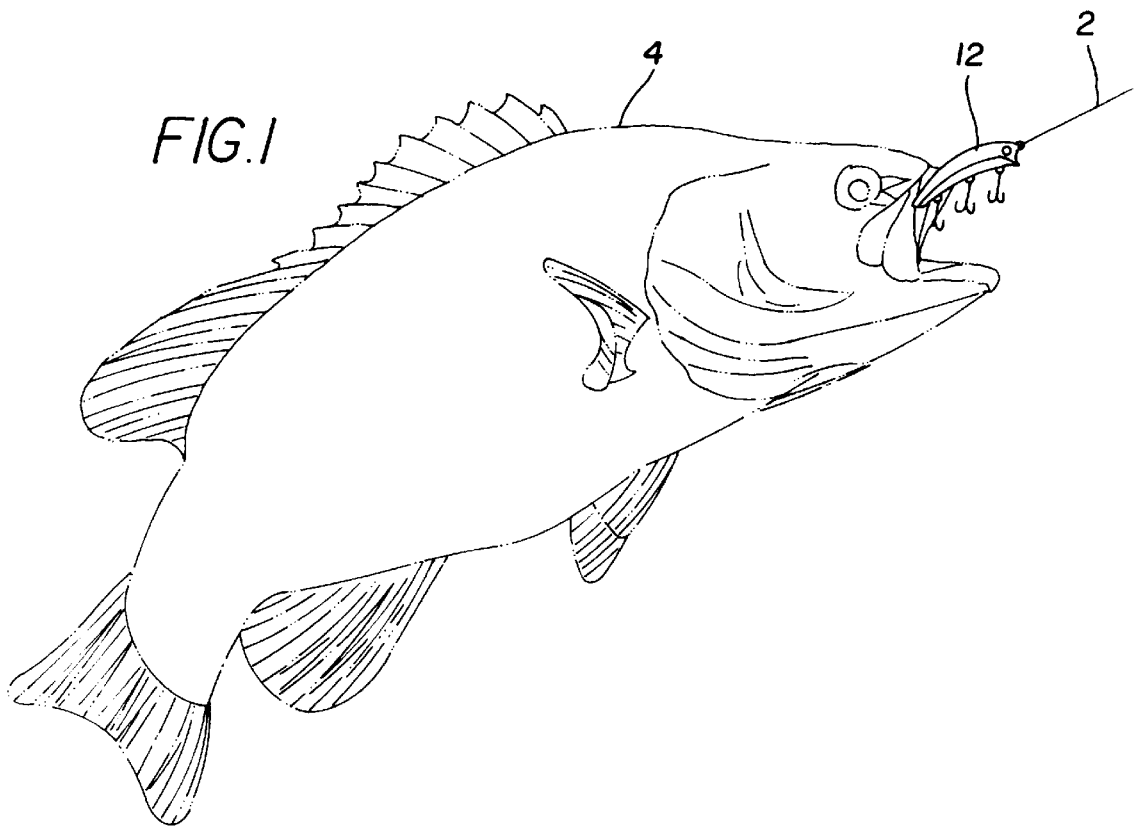
FIG. 1 is a side perspective view of a new electronic fishing lure assembly according to the present invention.
Figure 2:
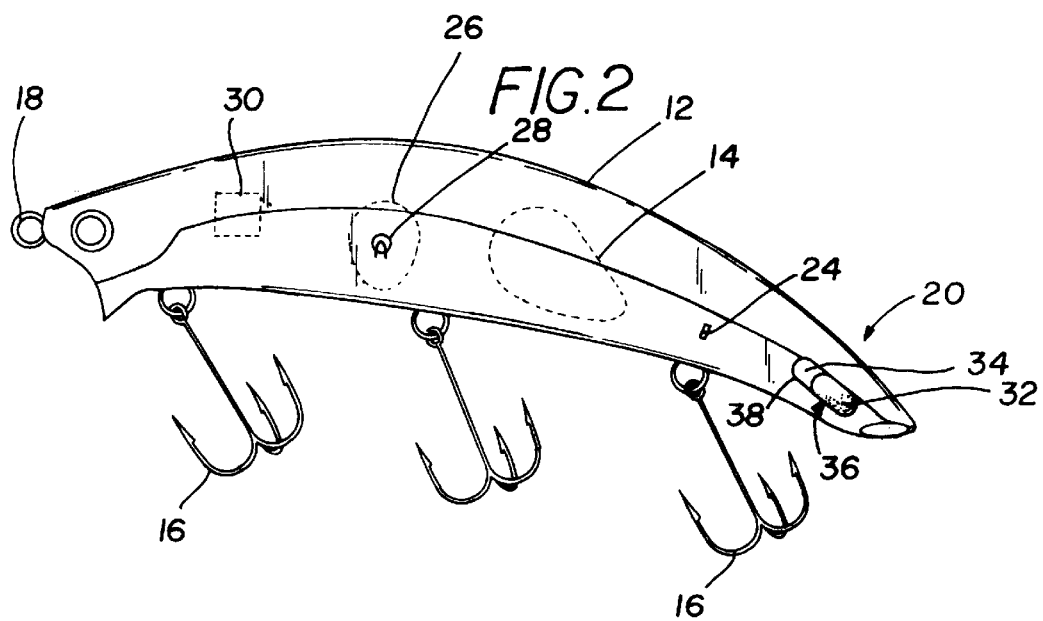
FIG. 2 is a side view of the present invention.
Figure 6:
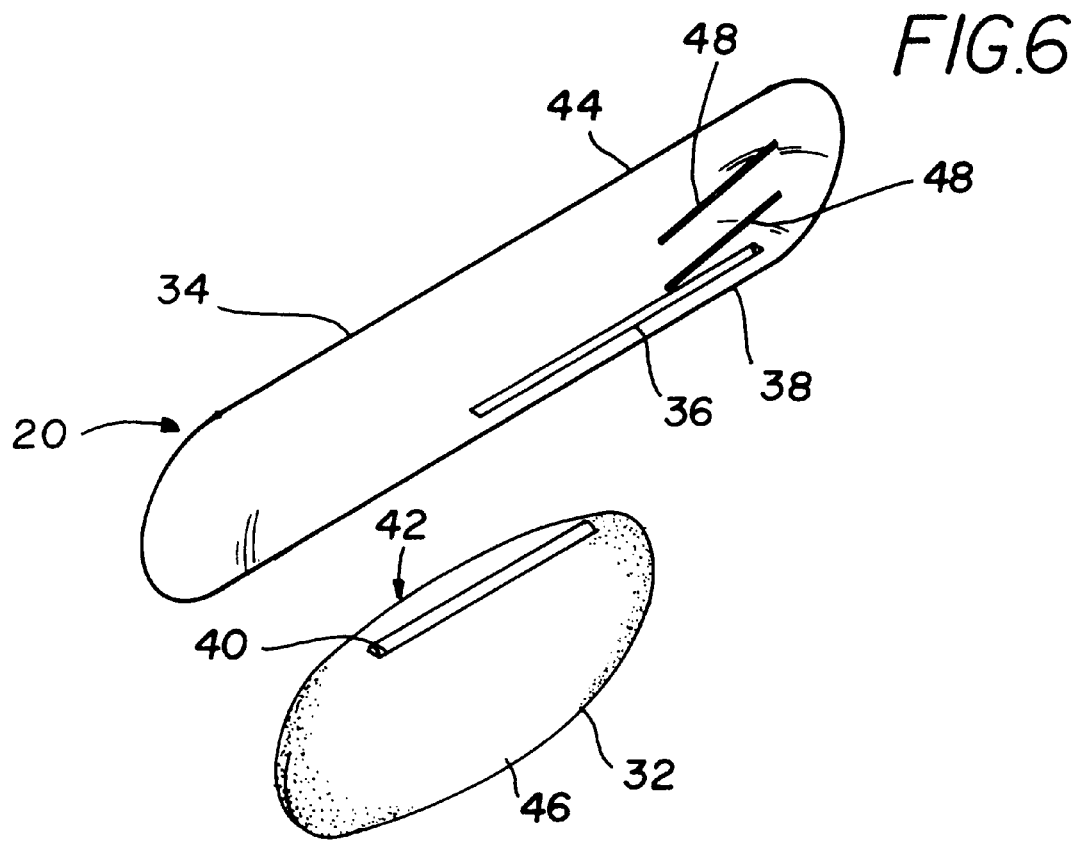
FIG. 6 is a cross-sectional view of the present invention.
Figure 7:
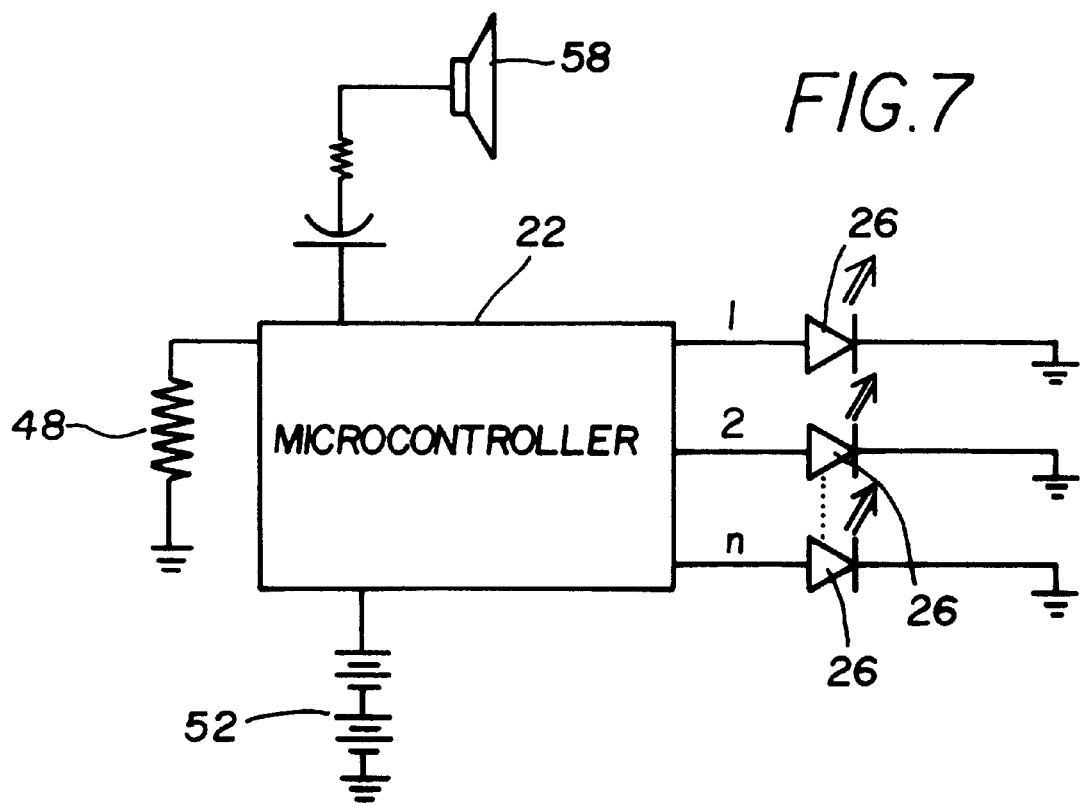
FIG. 7 is a schematic view of the microcontroller of the present invention.

With reference now to the drawings, and in particular to FIGS. 1 through 7 thereof, a new electronic fishing lure assembly embodying the principles and concepts of the present invention and generally designated by the reference numeral 10 will be described.

As best illustrated in FIGS. 1 through 7, the electronic fishing lure assembly 10 generally includes a main body portion 12 having a hollow interior 14 and a plurality of hooks 16 coupled to the main body portion 12. A line eye 18 is coupled to the main body portion 12 such that the line eye 18 is designed for facilitating tying the main body portion 12 to a fishing line 2.

A scent producing assembly 20 is coupled to the main body portion 12. A microcontroller 22 is positioned in the hollow interior 14. The microcontroller 22 is electronically coupled to the scent producing assembly 20. A switch 24 is coupled to the main body portion, the switch 24 being electrically coupled to the microcontroller 22 for selectively activating the microcontroller 22. The main body portion 12 also includes a translucent portion 26. A light 28 is positioned in the hollow interior 14 such that the translucent portion 26 appears illuminated when the light 28 is on. The light 28 is electrically coupled to the switch 24 for selectively activating the light 28. A motion producing assembly 30 of the type having a motor for producing a vibrational movement, is positioned in the hollow interior 14 for moving the main body portion 12 in a vibratory motion. The motion producing assembly 30 is electrically coupled to the switch 24 for selectively activating the motion producing assembly 30.

The scent producing assembly 20 includes a scent capsule 32 for releasing a scent upon heating of the scent capsule 32. The main body portion 12 includes a depression 34 in an outer surface of the main body portion 12, the depression 34 being for receiving the scent capsule 32 therein. A groove 36 extends along a lower edge 46 of the depression 34 for receiving a lower edge 46 of the scent capsule 32. The scent capsule 32 includes a retaining ridge 40 extending along an upper edge 42 of the scent capsule 32 for engaging an upper edge 44 of the depression 34 whereby the scent capsule 32 is coupled to the main body portion 12 when the lower edge 46 of the scent capsule 32 is inserted into the groove 36 and the retaining ridge 40 is engaged to the upper edge 44 of the depression 34. A pair of heating prongs 48 extend outwardly from a surface of the depression 34 such that the heating prongs 48 are insertable into the scent capsule 32 for heating the scent capsule to release the scent.

The main body portion 12 includes a battery compartment 50 for holding at least one battery 52 for providing power to the microcontroller 22. A battery compartment cap 54 is provided for covering the battery compartment 50. The battery compartment cap 54 is selectively removable for providing access to the battery compartment 50. The battery compartment cap 54 threadingly engages the main body portion 12. The battery compartment cap 54 includes an o-ring seal member 56 for preventing water from entering the battery compartment 50. A speaker 58 is positioned in the hollow interior 14 for producing a sound for attracting fish 4. The microcontroller 22 is electronically coupled to the speaker 58 for controlling the sound for attracting fish 4.

In use, the electronic fishing lure assembly is tied to a fishing line and is pulled through the water. The lure emitting light, sound, and scent will entice the fish to bite on the fishing lure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing lure comprising:

a main body portion having a hollow interior;

a plurality of hooks coupled to said main body portion;

a line eye coupled to said main body portion such that said line eye is adapted for facilitating tying said main body portion to a fishing line;

a scent producing assembly coupled to said main body portion comprising a scent capsule for releasing a scent upon heating of said scent capsule, a depression in an outer surface of said main body portion for receiving said scent capsule, and a pair of heating prongs extending outwardly from a surface of said depression such that said heating prongs are insertable into said scent capsule;

a microcontroller positioned in said hollow interior, said microcontroller being operationally coupled to said scent producing assembly; and a switch coupled to said main body portion, said switch being operationally coupled to said microcontroller for selectively activating said microcontroller.

2. The fishing lure of claim 1, further comprising:

said main body portion having a translucent portion; and a light positioned in said hollow interior such that said translucent portion appears illuminated when said light is on.

3. The fishing lure of claim 2, further comprising:

said light being operationally coupled to said switch for selectively activating said light.

4. The fishing lure of claim 1, further comprising:

a motion producing assembly positioned in said hollow interior for moving said main body portion in a vibratory motion, said motion producing assembly being operationally coupled to said switch for selectively activating said motion producing assembly.

5. The fishing lure of claim 1, wherein said scent producing assembly further comprises:

a groove extending along a lower edge of said depression for receiving a lower edge of said scent capsule, said scent capsule having a retaining ridge extending along an upper edge of said scent capsule for engaging an upper edge of said depression whereby said scent capsule is coupled to said main body portion when said lower edge of said scent capsule is inserted into said groove and said retaining ridge is engaged to said upper edge of said depression.

6. The fishing lure of claim 1, further comprising:

said main body portion having a battery compartment for holding at least one battery for providing power to said microcontroller; and a battery compartment cap for covering said battery compartment, said battery compartment cap being selectively removable for providing access to said battery compartment.

7. The fishing lure of claim 6, further comprising:

said battery compartment cap threadingly engaging said main body portion, said battery compartment cap having an o-ring seal member for preventing water from entering said battery compartment.

8. The fishing lure of claim 1, further comprising:

a speaker positioned in said hollow interior for producing a sound for attracting fish; and said microcontroller being operationally coupled to said speaker for controlling said sound for attracting fish.

9. The fishing lure of claim 1, further comprising:

a diving plate coupled to said main body portion for facilitating deep water fishing.

10. The fishing lure of claim 1, further comprising:

said main body portion having an upturned forward portion for facilitating fishing at shallow depths.

11. A fishing lure comprising:

a main body portion having a hollow interior;

a plurality of hooks coupled to said main body portion;

a line eye coupled to said main body portion such that said line eye is adapted for facilitating tying said main body portion to a fishing line;

a scent producing assembly coupled to said main body portion;

a microcontroller positioned in said hollow interior, said microcontroller being operationally coupled to said scent producing assembly;

a switch coupled to said main body portion, said switch being operationally coupled to said microcontroller for selectively activating said microcontroller;

said main body portion having a translucent portion;

a light positioned in said hollow interior such that said translucent portion appears illuminated when said light is on;

said light being operationally coupled to said switch for selectively activating said light;

a motion producing assembly positioned in said hollow interior for moving said main body portion in a vibratory motion, said motion producing assembly being operationally coupled to said switch for selectively activating said motion producing assembly;

wherein said scent producing assembly includes:

a scent capsule for releasing a scent upon heating of said scent capsule, a depression in an outer surface of said main body portion, said depression being for receiving said scent capsule, a groove extending along a lower edge of said depression for receiving a lower edge of said scent capsule, said scent capsule having a retaining ridge extending along an upper edge of said scent capsule for engaging an upper edge of said depression whereby said scent capsule is coupled to said main body portion when said lower edge of said scent capsule is inserted into said groove and said retaining ridge is engaged to said upper edge of said depression, and a pair of heating prongs extending outwardly from a surface of said depression such that said heating prongs are insertable into said scent capsule;

said main body portion having a battery compartment for holding at least one battery for providing power to said microcontroller;

a battery compartment cap for covering said battery compartment, said battery compartment cap being selectively removable for providing access to said battery compartment;

said battery compartment cap threadingly engaging said main body portion, said battery compartment cap having an o-ring seal member for preventing water from entering said battery compartment;

a speaker positioned in said hollow interior for producing a sound for attracting fish; and said microcontroller being operationally coupled to said speaker for controlling said sound for attracting fish.

12. The fishing lure of claim 11, further comprising:
a diving plate coupled to said main body portion for facilitating deep water fishing.

13. The fishing lure of claim 11, further comprising:
said main body portion having an upturned forward portion for facilitating fishing at shallow depths.

* * * * *